US008755769B2

United States Patent
Aaltonen et al.

(10) Patent No.: US 8,755,769 B2
(45) Date of Patent: Jun. 17, 2014

(54) SYSTEMS, METHODS, NETWORK ELEMENTS AND APPLICATIONS IN CONNECTION WITH BROWSING OF WEB/WAP SITES AND SERVICES

(75) Inventors: Janne Aaltonen, Turku (FI); Sami Saru, Turku (FI); Janne Kalliola, Espoo (FI)

(73) Assignee: Apple Inc., Cupertino, CA (US)

( * ) Notice: Subject to any disclaimer, the term of this patent is extended or adjusted under 35 U.S.C. 154(b) by 500 days.

(21) Appl. No.: 13/059,423

(22) PCT Filed: Sep. 23, 2009

(86) PCT No.: PCT/EP2009/062348
§ 371 (c)(1),
(2), (4) Date: Sep. 26, 2011

(87) PCT Pub. No.: WO2010/034759
PCT Pub. Date: Apr. 1, 2010

(65) Prior Publication Data
US 2012/0016748 A1   Jan. 19, 2012

Related U.S. Application Data

(60) Provisional application No. 61/099,403, filed on Sep. 23, 2008.

(51) Int. Cl.
*H04M 11/08* (2006.01)
(52) U.S. Cl.
USPC ............... 455/406; 455/414.1; 709/227
(58) Field of Classification Search
USPC ......... 455/405, 406, 414.1; 705/14.69, 14.73; 707/999.003, E17.108
See application file for complete search history.

(56) References Cited

U.S. PATENT DOCUMENTS

| 6,876,661 | B2 * | 4/2005 | Asai | 370/401 |
|---|---|---|---|---|
| 7,689,510 | B2 * | 3/2010 | Lamkin et al. | 705/51 |
| 8,254,880 | B2 * | 8/2012 | Aaltonen et al. | 455/406 |
| 2002/0120564 | A1 * | 8/2002 | Strietzel | 705/40 |
| 2002/0177431 | A1 * | 11/2002 | Hamilton et al. | 455/406 |
| 2006/0080439 | A1 * | 4/2006 | Chud et al. | 709/225 |
| 2006/0100928 | A1 * | 5/2006 | Walczak et al. | 705/14 |
| 2006/0168622 | A1 * | 7/2006 | Poll et al. | 725/46 |

(Continued)

FOREIGN PATENT DOCUMENTS

| EP | 1003344 A2 * | 5/2000 | H04Q 7/22 |
|---|---|---|---|
| GB | 2 445 431 | 7/2008 | |

(Continued)

OTHER PUBLICATIONS

Chisholm, W. et al., "HTML Techniques for Web Content Accessibility Guidelines 1.0", Nov. 6, 2000, www.w3.org.*

(Continued)

*Primary Examiner* — Farid Homayounmehr
*Assistant Examiner* — Zhimei Zhu
(74) *Attorney, Agent, or Firm* — Novak Druce Connolly Bove + Quigg LLP

(57) ABSTRACT

Methodologies, systems and software support or implement functionality to provide sponsored browsing of web/WAP sites and/or services for mobile device users wherein web sites are selected for browsing in dependence on a data size requirement for providing access to content available from a given web/WAP site.

26 Claims, 3 Drawing Sheets

(56) References Cited

U.S. PATENT DOCUMENTS

| | | | |
|---|---|---|---|
| 2006/0253578 A1* | 11/2006 | Dixon et al. | 709/225 |
| 2007/0058674 A1* | 3/2007 | Bucher et al. | 370/468 |
| 2007/0060109 A1* | 3/2007 | Ramer et al. | 455/414.1 |
| 2007/0162502 A1* | 7/2007 | Thomas et al. | 707/104.1 |
| 2007/0174255 A1* | 7/2007 | Sravanapudi et al. | 707/3 |
| 2007/0214083 A1* | 9/2007 | Jones et al. | 705/41 |
| 2008/0086496 A1* | 4/2008 | Kumar et al. | 707/102 |
| 2008/0228758 A1* | 9/2008 | Aaltonen et al. | 707/5 |
| 2009/0171990 A1* | 7/2009 | Naef, III | 707/100 |
| 2010/0174607 A1* | 7/2010 | Henkin et al. | 705/14.53 |
| 2011/0282927 A1* | 11/2011 | Arsenault | 709/201 |
| 2012/0311705 A1* | 12/2012 | Dixon et al. | 726/22 |

FOREIGN PATENT DOCUMENTS

| | | | | |
|---|---|---|---|---|
| WO | WO 9836585 A2 * | 8/1998 | | H04Q 3/00 |
| WO | WO 02096026 A1 * | 11/2002 | | |
| WO | 2005/043341 | 5/2005 | | |

OTHER PUBLICATIONS

International Search Report for International Application No. PCT/EP2009/062348, dated Dec. 23, 2009.

* cited by examiner

SYSTEMS, METHODS, NETWORK ELEMENTS AND APPLICATIONS IN CONNECTION WITH BROWSING OF WEB/WAP SITES AND SERVICES

CROSS-REFERENCE TO RELATED APPLICATION

The present application claims the benefit of priority to International Patent Application No. PCT/EP2009/062348 filed 23 Sep. 2009 and which claims the benefit of priorities to U.S. Provisional Patent Application No. 61/099,403 filed 23 Sep. 2008, the contents of which are incorporated herein by reference in their entirety.

The invention relates in general to enabling browsing of web/WAP sites and/or services for mobile device users. In particular, the invention relates to supporting or implementing functionality to operate and administer a system and service in which web sites are selected for browsing in dependence on a data size requirement for providing access to content available from a given web/WAP site.

BACKGROUND OF THE INVENTION

The overwhelming popularity of mobile devices such as smart phones has opened up the possibility of using mobile devices and related communication infrastructure as a media for providing what may be referred to as "mobile marketing" to potential recipients. Mobile marketing involves and relates to marketing and advertising via mobile devices, e.g., mobile phones, smart phones, and Personal Data Assistants (PDAs), or any other computer device configured to be able to receive or send data wirelessly, receiving promotional content, e.g., marketing and/or advertising content in the form of, e.g., text, audio, video or some combination thereof associated with a particular product, service or combination thereof.

More and more mobile devices are capable of browsing the Internet via a mobile network using various protocols including Wireless Application Protocol (WAP). WAP is an open international standard for application layer network communications in a wireless communication environment. Its main use is to enable access to the Internet from a mobile device. Thus, mobile devices capable of browsing the Internet include a WAP browser that provides all of the basic services of a computer based web browser but is simplified to operate within the restrictions of a mobile device, e.g., a smaller view screen than is generally available on a desktop computer. WAP sites are websites written in, or dynamically converted to, Wireless Markup Language (WML) and accessed via a mobile device's WAP browser.

In addition to mobile devices that use WAP, various mobiles are capable of providing access to Internet services using the devices' web browser. For example, many Nokia® mobile devices have web browsers that can be used to access any web page. In addition, mobile devices like Apple's iPhone® have an embedded Safari® browser for accessing any Internet page. Thus, it should be appreciated that WAP is only one example of the type of browsing conventionally provided via mobile devices.

Thus, if a mobile device has a WAP/Web browser, it can be used to access data services from Internet such as web browsing, reading documents, downloading music and videos, watching TV, downloading pictures, uploading information, electronic mail, using Voice Over Internet Protocol (VOIP), etc.

Billing for mobile network services including WAP/Web implemented browsing of the Internet can be implemented in various ways from business point of view. Some mobile network service providers (e.g., network operators, carriers, etc.) offer fixed cost plans wherein a mobile user can access network resources as much as they want during a specified period of time. Alternatively, some mobile network service providers offer a specified amount of network resources, e.g., a certain amount of megabytes at a fixed price; still others offer such a fixed price with the option to purchase additional resource access at a specified rate. As a further alternative, some carriers simply charge a fixed rate per megabyte. As a result, the cost of browsing using one's mobile device can be significant for a mobile device user.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one embodiment of the invention, methodologies and mechanisms are provided that provide methods, systems and software for supporting or implementing functionality to provide browsing of WAP/Web sites and/or services for mobile device users wherein third parties sponsor such browsing and/or distribute content in connection with such browsing, as specified in the independent claims. This is achieved by a combination of features recited in each independent claim. Accordingly, dependent claims prescribe further detailed implementations of the present invention More specifically, according to a first aspect of the invention there is provided a system configured to operate a web-browsing service, the system comprising:

one or more network elements configured to receive instructions from a mobile device to access target content or services via the Internet and analyze the instructions and the target content or service source to determine a data size requirement for providing access to the target content or service source; and a messaging system configured to enable access to the target content or service source via a first access session if the determined data size requirement is less than a value specified by a first access enabling entity, wherein the messaging system is configured to identify at least one alternative content or service source corresponding to the instructions received from the mobile device if the target content or service source has a data size requirement that is larger than the specified value.

In one arrangement the messaging system is configured to select an information provider to enable said first access session based on an amount of data that the information provider has agreed to support in return for distribution of content associated with the information provider. In the event that the data size requirement exceeds the specified value, the messaging system is configured to enable access to the alternative content via a second access session; this second access session typically involves accessing a content or service source which provides access to a web site (corresponding to the instructions received from the mobile device) from which data of a smaller size can be downloaded, and in respect of which the downloading of data can be supported by an information provider.

In a further arrangement the messaging system is configured to receive from the mobile device a selection from among a plurality of alternative content or service sources, and wherein the messaging system is configured to instruct the at least one network element to enable access to the selected one of the alternative content or service sources, whereby to enable a second access session on the basis of the selected one or more alternative content or service sources.

Thus in embodiments of the invention the selection of a web/WAP site to be accessed is dependent on a data access threshold. In the event that the web site corresponding to instructions received from the mobile device (e.g. in the form of a query) to access target content or services exceeds the threshold—e.g. because the web site in question has data heavy pictures and/or lots of advertisements, e.g. moving video type advertisements—the network element(s) directs the user to an alternative web page serving similar content but which is less data heavy. When a user downloads data from this alternative website, the data can be supplemented by additional messages which can be embedded within the data downloaded from the alternative website or sent separate therefrom. As a result, the load on the network is lower than it otherwise would be, while the user nevertheless receives data corresponding to his query.

In this case the threshold quantifies a maximum amount of web/WAP data that will be downloaded when accompanied by a supplementary message or a plurality of supplementary messages. Since this message or these messages are likely to be significantly smaller in size than the data that can be downloaded from resource-heavy websites, this means that in typical scenarios, transmission of these messages in addition to transmission of data from the alternative website represents a very small additional load on the network. Thus, the existence of the threshold, in relation to what are often very resource-heavy websites, enables a controlled mechanism for enabling access to a known amount of content for a very small relative resource requirement associated with the additional messaging.

In accordance with other aspects of the invention there is provided a computer readable medium comprising computer readable instructions to be executed on a computer, or a distributed computing system, embodied as the afore-mentioned system.

BRIEF DESCRIPTION OF THE DRAWINGS

A more complete understanding of the present invention and the utility thereof may be acquired by referring to the following description in consideration of the accompanying drawings, in which like reference numbers indicate like features, and wherein.

DETAILED DESCRIPTION OF THE INVENTION

Figure 1:
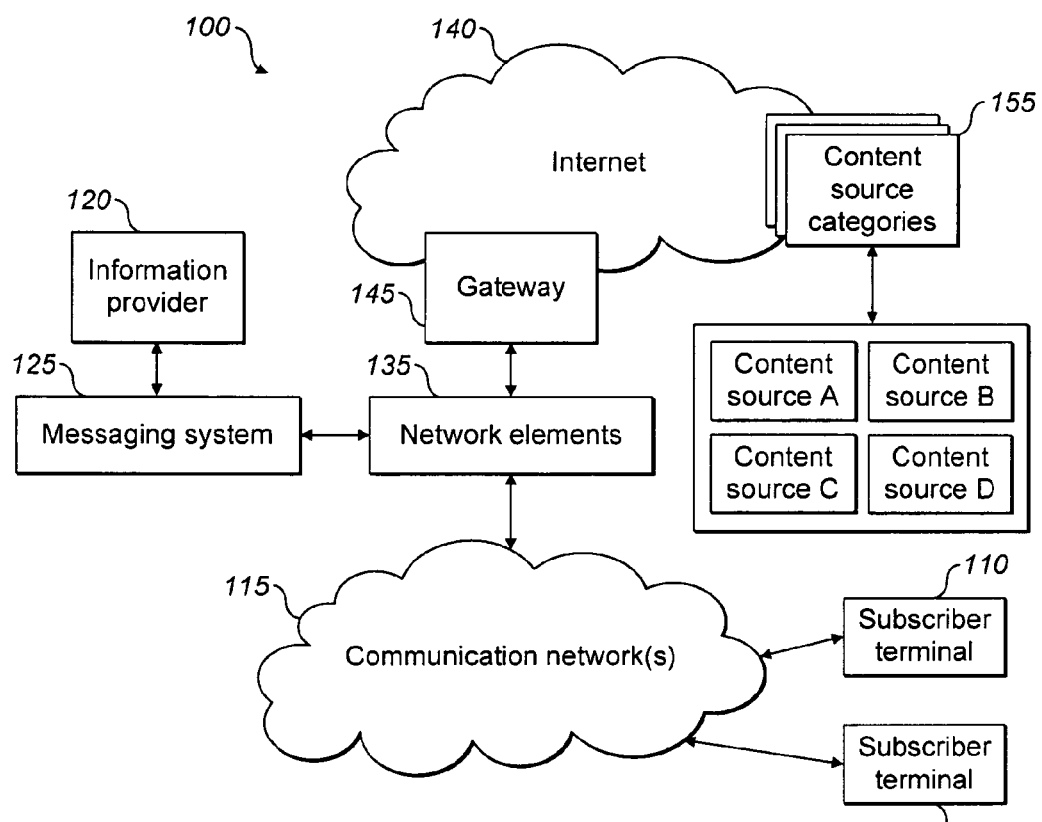
FIG. 1 illustrates an environment wherein embodiments of the invention may be utilized.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

As explained above, the cost of browsing using one's mobile device can be significant for a mobile device user. Accordingly, some portion of mobile device user's may be receptive to the sponsoring of such browsing by a third party in return for being exposed to content associated with the sponsor. Thus, such arrangements may be beneficially used to subsidize or underwrite all or part of the data connection fees associated with voice communication, messaging communication or browsing by mobile device users in return for receiving content as part of their browsing activity.

Thus, content (e.g. in the form of promotional content) may be distributed to mobile device users by, for example, adding content to communication between mobile device users, a mobile device user and another party or web site or service, etc. When the content is embodied as promotional content, it may be, for example, a web/WAP banner displayed in a web/WAP page accessed by the mobile device user. Alternatively, the content may be purely information in nature, and in the form of audio, video, multimedia, or applications such as games that may be accessed and/or consumed by the mobile device user via their mobile device.

A problem with providing subsidized (e.g., reduced cost) or underwritten (e.g., free) mobile services such as web browsing is the unpredictability and variability of the amount of network resources consumed by a mobile device user during a communication session or period of mobile services. Accordingly, one conventional solution to predicting and limiting the amount of network resources dedicated to such subsidized or underwritten services has been to establish a "walled garden" type of Web/WAP portal through which a mobile device user must access the communication network resources. The term "walled garden" refers to a configuration wherein only certain selected content sources (e.g., Web pages) may be accessed with the mobile device via the communication network as part of the subsidized or underwritten mobile service. This is analogous to the well established free-phone toll number services commonly offered in the USA, where incoming calls to these toll numbers are screened for calling identity: all calls other than originating from a fixed line are rejected since the costs associated with calling these toll numbers from e.g. a mobile device is uncertain. In this case the "walled garden" is defined by the calling party identity.

Thus, in accordance with at least one embodiment of the invention, methodologies and mechanisms are provided that categorize content sources in such a way that the amount of mobile network resources necessary for enabling access to one or more of the content sources can be predicted, monitored and managed. Optionally, the amount of mobile network resources necessary for enabling access to the content sources may be compared with sponsor-associated revenues and/or user or mobile service provider settings in order to determine which content source should provide the mobile device with the requested content.

In one illustrative implementation, such content sources may be web pages that may be categorized based on their size, i.e., the amount of data required to be accessed to display the web page.

With this understanding of one area of the utility of embodiments of the invention in mind, a description of the operation and architecture of various invention embodiments is now provided.

Operation of various invention embodiments may be most effectively understood through an illustrative example of how content sources, e.g., web pages, may be categorized so as to be prioritized for delivery to a mobile device. Assume that there are set of web pages www.alpha.com, www.beta.com, www.gamma.com, www.delta.com, www.epsilon.com and www.zeta.com. Such web pages can be categorized based on the subject matter of the content available on those web pages. For example, the web pages may be categorized into three categories, for example, News, Sports and Travel). It is foreseeable that some web pages may provide content that fall into more than one category as illustrated in Table 1.

TABLE 1

| Web Page | News | Sports | Travel | Size of Web Page |
|---|---|---|---|---|
| www.alpha.com | Yes | No | No | 11 Mbytes |
| www.beta.com | Yes | No | Yes | 100 Kbytes |
| www.gamma.com | No | Yes | No | 10 Mbytes |
| www.delta.com | Yes | No | No | 200 Mbytes |
| www.epsilon.com | No | No | No | 200 Kbytes |
| www.zeta.com | No | Yes | No | 800 Kbytes |

Thus, in reviewing Table 1, it can be recognized that www.alpha.com and www.beta.com are both sources for news content; however, the size of www.alpha.com is much greater, i.e., 11 Mbytes, then www.beta.com, i.e., 100 Kbytes. As a result, the network resources necessary to provide www.alpha.com to a mobile subscriber would be significantly more than those necessary to do likewise for www.beta.com because of the increase in data.

Assuming that an information provider is interested in enabling access to the content, the ability to readily identify content sources on particular topics and also know those content sources data content sizes enables delivery of content to mobile subscribers on a particular subject matter while limiting the network resources necessary to deliver that content. This constitutes an efficient access session for the user and the network. Thus, if a mobile subscriber is interested in visiting www.alpha.com to obtain news content, the mobile subscriber may be presented with the option to visit www.beta.com (which requires less data delivery and, therefore, less network resources).

The information providers may sponsor delivery of content in various ways. For example, assume that information providers A1, A2 and A3 are interested in sponsoring content delivery of various sizes, e.g., 1 Mbyte by A1, 10 Mbyte by A2 and 500 Kbyte by A3. Thus, if a recipient C1 is interested in accessing content at www.beta.com, which has a size of 100 Kbytes, the access may be sponsored by any of the information providers A1, A2, or A3; accordingly, following selection from among one of the information providers A1, A2, or A3 (in a manner explained herein), content for the selected advertiser may be may be attached to, inserted in or otherwise delivered to recipient C1's mobile device in connection with recipient C1's access of the www.beta.com. For example, content such as text, graphics, video, audio, etc., may be output via the mobile device prior to enabling access to the web page.

As another example, assume that recipient C2 wants to access content at www.epsilon.com or www.zeta.com, for example, to review content on those web pages or utilize web services available at those pages (e.g., play games, watch videos, shop, etc.). Recipient C1's access session can be enabled by A1 or A2 because www.epsilon.com has a content size of 200 Kbytes and www.zeta.com has a content size of 800 Kbytes; this is because information provider A1 has agreed to sponsor up to 1 Mbyte of content and information provider A2 has agreed to sponsor up to 10 Mbytes. However, it should be appreciated that information provider A3 may sponsor a portion of the access session because information provider A3 has agreed to sponsor up to 400 Kbytes. Thus, content associated with advertiser A3 may be presented to the recipient C1 in the same manner as information provider A1 or A2 and may, optionally, include a message that the access session is partially sponsored, subsidized or underwritten by information provider A3. Likewise, if recipient C3 wishes to access www.alpha.com, the access session may be sponsored by both information provider A1 and A2 together; thus, content for both A1 or A2 would be output to the mobile device prior to or as part of access to www.alpha.com.

In a further example, assume recipient C4 wishes to access www.gamma.com, the access session can be fully sponsored only by information provider A2. This is because www.gamma.com has a data size of 10 Mbytes, which is larger than the agreed to data levels for information provider A1 or A3.

Thus, it should be understood that illustrated embodiments may be used to select from one or more information providers based on an amount of data required for access to a target web site or web service.

In accordance with an additional embodiment of the invention, a mobile device user may be provided with an option to visit an alternate web site and thereby participate in an alternative access session e.g. if the user's target web site is too large to be sponsored by an information provider. For example, assume that recipient C5 wishes to access a News site, e.g., www.lotsofnews.com; however, the data size for www.lotsofnews.com is too large to enable subsidized or underwritten access, for example, 25 Mbytes. When the recipient C5 requests access to www.lotsofnews.com, the recipient C5 may be given the option to access www.almostasmuchnews.com and have that access be supported (e.g., subsidized or underwritten) by a specified information provider in return for being exposed to the advertiser's content. Further, the access request may be provided with more than one alternative website that provides content on the same subject matter as the target web page. As an alternative, the recipient C5 may sign up for a service provided in accordance with at least one illustrated embodiment wherein the recipient's attempted access of web pages that are too large for sponsorship are automatically rerouted to web pages known to provide similar content.

There are various ways to determine the subject matter available at a web page. For example, conventionally used tags or metadata that are tracked and utilized by search engines, e.g., Google™, Yahoo™ in order to provide search results may be used to categorize web pages and provide alternative web pages. Additionally, some search engines gather and provide an indication of web sites and pages that are similar, e.g., a link entitled "Similar Pages" that may be excited to access content similar to that displayed by a search engine.

Further, there are various ways in which alternative web pages may be ranked for display to a mobile user (or selected for optional or automatic redirection of the mobile user) as alternatives to a target web page. For example, ranking may be based on size of the alternative web pages, or based on agreements with those that administer or maintain the alternative web pages (for example, as preferred web pages), based on preferences of the mobile service provider providing mobile services to the mobile user or and/or preferences of the mobile device user (for example, if the user has subscribed to a sponsorship service. Moreover, ranking may be based on which alternative web page is of sufficiently small size so as to be sponsored by more advertisers.

In practice, various illustrated embodiments may be implemented in an environment as illustrated in FIG. 1.

FIG. 1 illustrates an environment 100 wherein embodiments of the invention may be utilized to provide subsidized or underwritten access to web content or services which reaches a plurality of recipients/customers via subscriber mobile devices 105, 110 via a plurality of different types of networks, e.g., Internet 140 and one or more communication networks (e.g., mobile networks) 115.

As explained above, at least one invention embodiment may be implemented to assist in enabling of mobile device users' access to web content and/or services. Thus, as illustrated in FIG. 1, an information provider 120 (which may be an advertiser, advertising firm, media agency, news provider, operator, consultancy company, promotion company or other similar entity interested in distributing content e.g. in the form of an advertising campaign) may access a messaging system (AMS) 125 (also illustrated in further detail in FIG. 3) to manage and control distribution of content in connection with one or more messaging campaigns.

The information providers 120 may reserve, program, and/or book a campaign via a user interface (explained further with reference to FIG. 3 and implemented as, for example, a web interface) for AMS 125. Further, the information providers 120 may also define a set of rules governing and related to the delivery of content to a plurality of users (via subscriber mobile devices 105, 110). For example, an information provider 120 may utilize the AMS 125 to indicate what, when and how content should be delivered to mobile device users in connection with enabling access to web content and related services.

As part of such campaigns, content may be distributed to the one or more of the plurality of subscriber mobile devices 105, 110, which may be, for example, mobile devices or other devices capable of sending and receiving data and text messages and outputting such messages to the device users. Such content may include information in the form of data, text, pictures, audio, video, HyperText Markup Language (HTML), eXtensible Markup Language (XML), eXtensible HyperText Markup Language (XHTML). The information providers 120 may also indicate instructions and/or rules indicating what, when and how to send content, details regarding which users should receive content (e.g., characteristics of device users included in a particular demographic group or groups for the campaign), in which format (e.g., SMS, IM, electronic mail, MMS, WAP Push, Web pages, digital object, etc.), a target price level for the campaign, demographics of the target audience, duration of the campaign, etc.

It should be understood that each of the subscriber mobile devices 105, 110 can be implemented as a mobile phone, lap top, PDA, multimedia computer, smart phone, etc. Accordingly, although not illustrated, it should be understood that a subscriber terminal 105, 110 may include a processor connected to a user interface, computer readable memory and/or other data storage and a display and/or other output device. The subscriber terminal 105, 110 may also include a battery, speaker and at least one antenna. The user interface may further include a keypad, touch screen, voice interface, one or more arrow keys, joy-stick, data glove, mouse, roller ball, touch screen or the like.

Accordingly, computer executable instructions and data used by a processor included in a subscriber terminal 105, 110 and other components within a mobile device may be stored in the computer readable memory included in the subscriber terminal 105, 110. Further, the memory may be implemented with any combination of read only memory modules or random access memory modules, optionally including both volatile and non-volatile memory. Further, software may be stored within the memory and/or storage to provide instructions to the subscriber terminal's processor for enabling the mobile device to perform various functions. Alternatively, some or all of the device computer executable instructions may be embodied in hardware or firmware (not illustrated).

Mobile devices 105, 110 may have capability to communicate with one or more different types of communication networks and have messaging capabilities including, e.g., a SMS client, electronic mail client or MMS client embedded in the terminal. Mobile devices 105, 110 may also include a browser (not shown) configured to access Web and/or WAP services.

The one or more communication networks 115 may include any type of communication network including but not limited to a second Generation (2G) network, a 2.5 Generation network, a third Generation (3G) network utilizing GSM, Wideband Code Division Multiplex Access (WCDMA), CDMA, or Time Division Multiplex Access (TDMA), GPRS, Universal Mobile Telephone System (UMTS), etc. Network(s) 115 can also be implemented as a combination of two or more technologies i.e., a hybrid network.

Further, the one or more communication networks 115 may also include Local Area Networks (LANs), such as Wireless Local Area Networks (WLAN), BlueTooth (BT) and optionally utilize one or more other technologies, such as WiMax (WorldwideInteroperability for Microwave Access). Communication via the one or more communication networks 115 may be implemented by broadcasting over cellular, broadcasting over DVB-H (Digital Video Broadcasting-Handhelds), ISDB-T (Terrestrial Integrated Services Digital Broadcasting), MediaFlo, or DMB (Digital Multimedia Broadcasting) or similar.

The one or more communication networks 115 can also include any other type of network of interconnected devices or device networks, e.g., interconnected computers or computer networks. Accordingly, it should be understood that the one or more communication networks 115 can also be a combination of a plurality of different types of networks forming one or more hybrid networks.

The network element(s) 135 are provided so as to maintain and operate the communication network(s) 115. As a result, the network element(s) 135 may include, for example, one or more Home Location Registers (HLRs), database including call detail records, SMS centers, MMS centers, etc. Additionally, the network element(s) 135 may include or be implemented to communicate with various additional components, e.g., a billing system, base stations and other elements, interfaces and functions conventionally understood to be of use in the operation and provision of a communication network(s). Further, the network element(s) 135 included in the communication network(s) 115 may further include one or more base stations or wireless communications stations (not shown)

installed at fixed locations and used to communicate as part of either a push-to-talk two-way radio system or a wireless telephone system, for example, cellular, CDMA or GSM.

Figure 2:
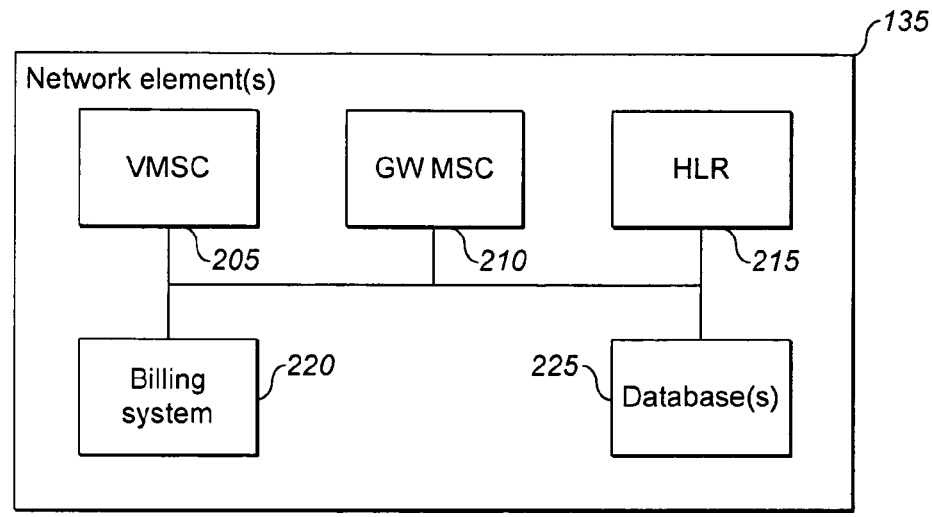
FIG. 2 illustrates additional details included in operator system components provided in accordance with at least one embodiment of the invention.

As mentioned above, subscriber mobile devices 105, 110 may be coupled to or utilize communication network(s) 115, which may be implemented as one or more communication networks and further may be implemented as one or more mobile networks. Therefore, in accordance with at least one embodiment of the invention, the network element(s) 135 included in the communication network(s) 115 may include a Base Transceiver Station (BTS), a Radio Access Network (RAS) and/or Base Station Controllers (BTCs) and/or Serving GRPS Support Nodes (SGSN) for data access. Moreover, as illustrated in FIG. 2, the network element(s) 135 may include a Visiting Mobile Switch Center (VMSC) 205, Gateway Mobile Switch Center (GWMSC) 210, Home Location Register (HLR) 215, a billing system 220, and various memory including databases 225 generated and used to maintain and operate the communication network(s).

Gateway 145 may be implemented as a WAP gateway and may be configured to provide two way communications between the Internet 140 and communication network(s) 115. Thus, gateway 145 may be conceptually thought of as a network point that acts as an entrance to these networks. The gateway 145 may be implemented as or include, a proxy server or firewall server, router and/or switch (not shown). It should be appreciated that gateway 145 may also be implemented as Gateway General Package Radio Service (GPRS) Support Node (GGSN) configured to connect radio networks to IP networks.

Thus, gateway 145 may be implemented to enable access to web services and content from the cellular infrastructure provided within communication network(s) 115. Thus, the gateway 145 may be configured to convert Internet protocol content and related services to a format or protocol appropriate for transmission via mobile networks and display via mobile devices.

As illustrated in FIG. 1, the network(s) 115 may include or be configured to provide communication functionality among a plurality of subscriber mobile devices 105, 110 which may be connected or coupled to communication network(s) 115 via, for example, one or more base stations (not shown). Additionally, communication sessions may occur between a plurality of subscriber mobile devices 105, 110 or a subscriber terminal 105, 110 and another entity, for example, a web page or web service. As a result, the subscriber terminal 105, 110 may utilize elements, for example, network elements 135 and the gateway 145 for WAP browsing or use of packet radio connections in the form of GPRS to access Internet 140 and Internet implemented web services via gateway 145, e.g., Internet access using a web browser in, e.g., a subscriber terminal and an IP connection.

It should be appreciated that embodiments of the invention may be implemented as follows. The AMS 125 may maintain or have access to information on one or more target web sites and services as well as information about the users of mobile devices using the communication network(s) 115. Web site and service information may be, for example, subject matter information as is conventionally collected by search engines. Mobile user specific information may include, for example, demographic information, information indicating the capabilities of a subscriber's mobile device, applicable data rates available to users via various carriers.

The functionality enabling redirection of a mobile device user to a sponsored content source (e.g., web page) may be implemented in the gateway 145, in one or more network elements 135 or in some combination wherein the gateway 145 is cooperating with one or more network elements 135 and, potentially, the AMS 125 to deliver content to mobile device users 105, 110 as part of enabling access to web content or web services.

Thus, in one example, the gateway 145 may be configured to request permission from the AMS 125 to access a target web site on behalf of a mobile device user 105. As part of this request, the gateway 145 may send information indicating the identity of the target web site and, if not already known to the AMS 125, data requirements for the target web site. Subsequently, based on the data requirements and access session agreements with one or more information providers, the AMS 125 may transmit content for an information provider selected to enable the web access session to the network elements 135 for transmission to the mobile device user 105 prior to enabling access to the target web site. Alternatively, the AMS 125 may not authorize access to the target web site but may trigger delivery of content associated with e.g. a sponsoring advertiser in tandem with optional or automatic redirection of the mobile device user 105 to a different web site with the same or related subject matter as the target site. Alternatively, the AMS 125 may not authorize access to the target web site but trigger transmission of a list of alternative web sites having the same or related subject matter as the target site as well as an indication that access to such web sites is sponsored to some degree and an identification of the sponsoring organization.

Thus, in accordance with at least one embodiment of the invention, the AMS 125 may be configured to operate as a mechanism for receiving content from information providers 120 and instructions on distributing content to recipient/customers, whereas the network element(s) 135 and gateway 145 may be configured to interact with the AMS 125 to receive such content and manage the delivery of such content along with content from the Internet 140 via the communication network(s) 115.

Figure 3:
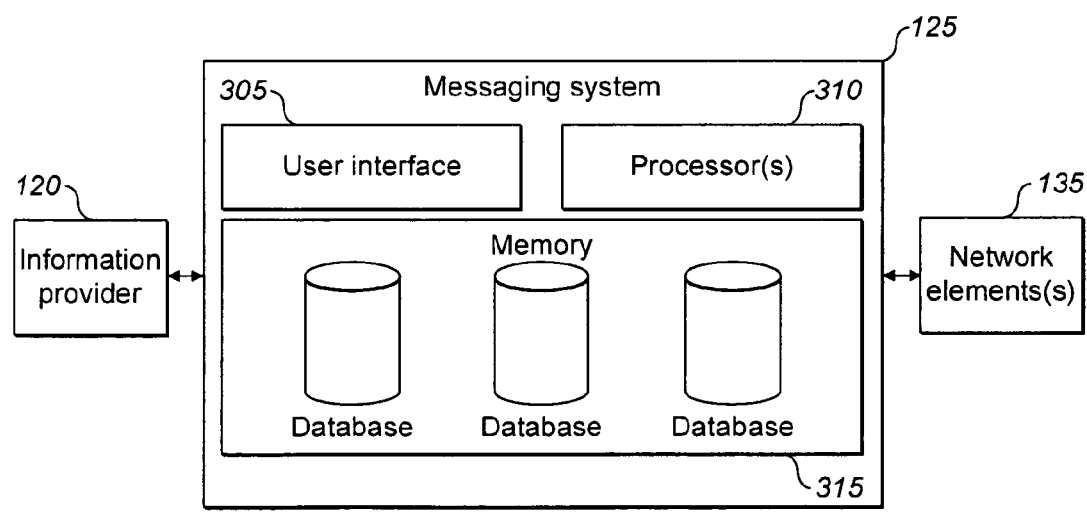
FIG. 3 illustrates additional details included in a messaging system provided in accordance with at least one embodiment of the invention.

FIG. 3 illustrates one example of the components of the AMS 125 in more detail. Preferences, settings, and content and/or other rules of distributing content may be stored in memory 315. Content may be commercial, e.g., product or service promotion or non-commercial messages such as general information services.

Once an information provider 120 has provided data indicating what, when and how content is to be distributed (e.g., the content, format and timing of content delivery) in connection with a message delivery campaign, the information may be used to deliver the content via the one or more communication networks 115 to one or more subscriber mobile devices 105, 110 using the AMS 125, the network elements 135 and the gateway 145.

As illustrated in FIG. 3, the AMS 125 may include one or more processors 305 operationally coupled to a user interface 310, computer readable memory and/or other data storage 315. Accordingly, computer executable instructions and data used by the processor(s) 305 and other components within the AMS 125 may be stored in the computer readable memory included the AMS 125. Further, software may be stored within the memory and/or storage 315 (coupled to the processor(s) 305 and user interface 310) to provide instructions to the AMS components for enabling the AMS 125 to perform various functions.

For example, the AMS 125 may be configured to receive content (e.g., audio, video, text, graphics, font type, font color, etc.) and format of the content (e.g., MMS, EMS, SMS, WAP push, etc.) associated with the messaging campaigns as well as other details regarding distribution of such content via the user interface 310. Subsequently, that information may be stored in one or more databases included in the computer readable memory and/or other data storage 315. Accordingly, the user interface 310 may be configured to enable an information provider 120 or other entity to interact with components of the AMS 125 as well as other systems coupled to the system 125 to manage and control distribution of content and analysis of responses thereto as part of one or more messaging campaigns. Accordingly, the user interface 310 may be implemented as a web-based user interface provided by software stored in the memory 315 or running on one or more servers associated with or supporting the AMS 125.

The memory 315 may include one or more databases configured to store content, preferences for distributing content, an archive of content previously sent to a plurality of users and their respective responses to such content as well as the type of content, rules for selecting content for distribution content, etc. Additionally, the memory 315 may also include one or more databases for storing actual content and related distribution parameters for use in distributing the content in connection with campaigns.

It should be understood that memory 315 may include many databases that separately include, for example, user profile information (including information about subscriber mobile devices), content, archive data, etc. or some combination or all of this information and data may be included in a single database.

Figure 4:
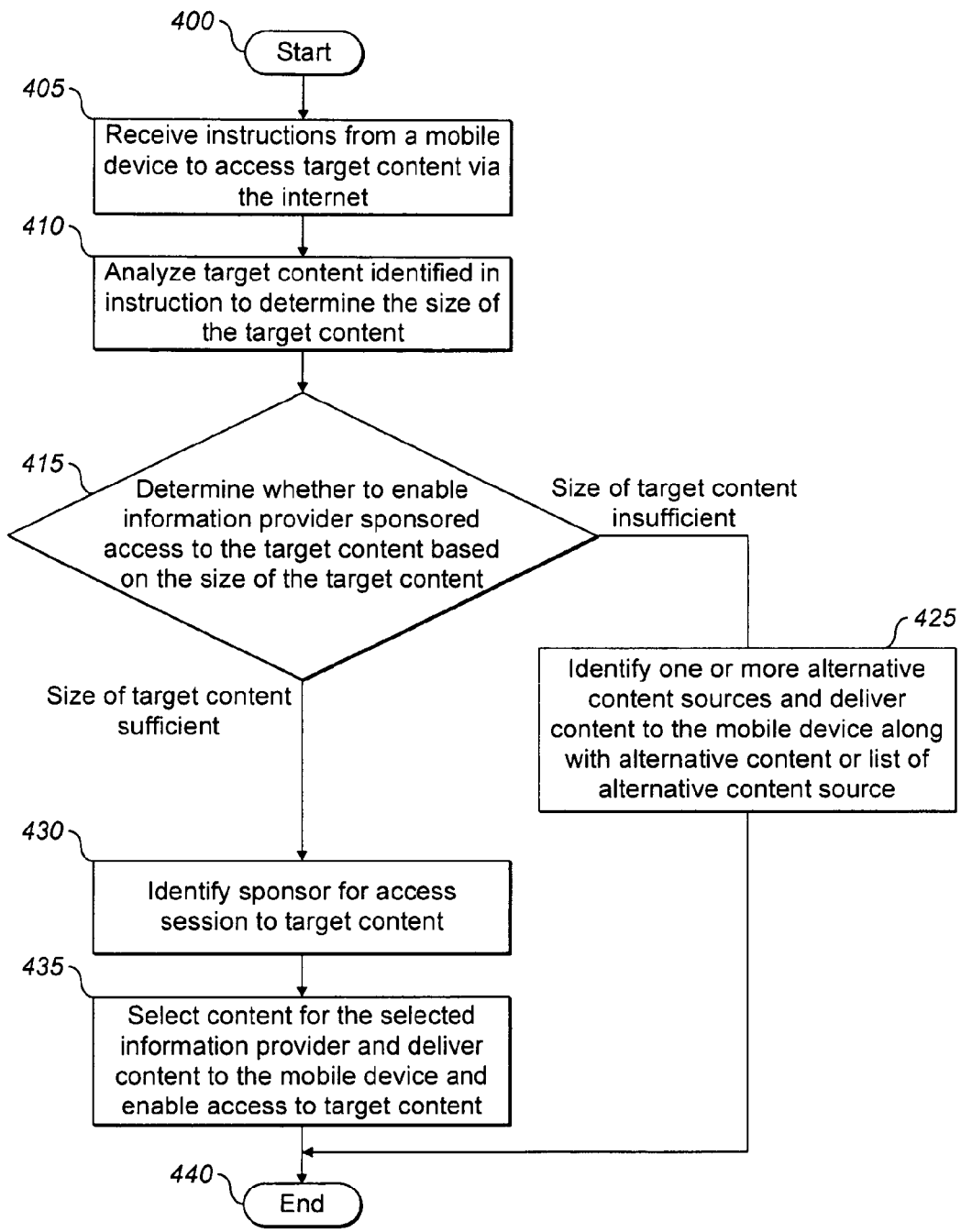
FIG. 4 illustrates method operations performed in accordance with at least one embodiment of the invention.

FIG. 4 illustrates an example of operation performed in accordance with at least one illustrated embodiment for managing a mobile device attempt to access a web service or content. As shown in FIG. 4, operations begin at 400 and control proceeds to 405 at which instructions are received from a mobile device to access target content via the Internet. Such instructions may be received via one or more network elements and/or a gateway. Based on those instructions, control proceeds to 410, at which the target content is analyzed to determine the size of the target content, e.g., a size of a web page, etc. Operations performed at 410 may be performed by accessing the target content or by accessing data indicating the size of the target content (e.g., if that data was available, for example, from a search engine or other entity familiar with the target content and reliable regarding its size). Control then proceeds to 415, wherein a determination is made whether to enable access to the target content based on the size of the target content.

If not, control proceeds to 420, wherein one or more alternative content sources are identified. Control then proceeds to 425, wherein the alternative content source or its identification is delivered to the mobile device. It should be appreciated that, if the alternative content source is delivered to the source instead of the target content, there may also be a message indicating that the target content is not available through a sponsored access but the alternative content is. As a further option, instead of automatically delivering the alternative content, a list of alternative content sources may be delivered to the mobile device with a message indicating that the target is not available through sponsored access but various other listed alternative content sources are available. As part of the operations performed at 425, content is also delivered to the mobile device as explained above. Control then proceeds to 440, at which operations end until a future request for access to target content is received.

If the target content is of a size such that it may be accessed via sponsored access, control proceeds to 430 at which a sponsor is identified for the access session. Control then proceeds to 435, at which content for the information provider is selected and delivered to the mobile device as explained above.

Control then proceeds to 440, at which operations end until a future request for access to target content is received.

As explained above, illustrated embodiments may be used to select from one or more advertisers based on an amount of data required for access to a target web site or web service. Alternatively, it should be appreciated that illustrated embodiments may be used to select from one or more different types of content for a information provider advertiser based on the amount of data required for target web site or web service access. For example, if a target content source (e.g., web site or web service) requires 10 Mbytes to access, the mobile device user may be required to watch a video including content, e.g., a commercial for the advertiser. As a further alternative, if the target content source requires 100 Kbytes to access, the mobile device user may only see a logo for the information provider and an indication that the access session is sponsored. Additionally, it should be understood that the amount of content for a particular advertiser may be based on the amount of data required for target web page or web service access. For example, as the amount of required data increases, the mobile device user may be exposed to increased lengths of an advertiser's audio jingle or promotional message.

Considering now embodiments in which access sessions are enabled specifically by promotional content associated with advertisers, advertisers may be selected by various schemes to ensure that the content is acceptable, persuasive and/or of interest to those receiving it. Therefore, sponsoring advertisers and/or promotional content may be selected by various schemes including, e.g., selecting a sponsoring advertiser or promotional content based on the category of the target web content source, e.g., selecting the Travelocity™ as a sponsoring advertiser for a target web content source relating to a vacation destination. Alternatively, or in addition, a sponsoring advertiser and/or promotional content may be selected based on a combination of mobile device user profiles (which may indicate, for example, information about the mobile user making the target web site request including the user's geographic location, demographic information including age, gender, interests, etc) and preferences with advertisers' target profiles (e.g., demographic information provided by an advertiser regarding target audience for promotional content and delivery preferences). In accordance with at least one embodiment of the invention, selection of sponsoring advertisers and/or promotional content may also or alternatively be selected by a round robin scheme, first reserve first serve, randomly etc.

Additionally, a history of promotional content transmitted to a particular mobile device user may be stored and archived (e.g., in memory 315 of AMS 125 illustrated in FIG. 3). As a result, an understanding of interests of a particular user/subscriber could be gained and used to enhance relevance of promotional content transmitted to the subscriber (e.g., archived content indicates that a subscriber is interested in horror movies, is interested in foreign films, is interested in music concerts, etc.) Further, analysis of promotional content to be transmitted may be performed in whole or part using special application software running in a mobile device.

Moreover, although not specifically illustrated or discussed above, one or more of the above-described components (e.g., AMS 125 illustrated in FIGS. 1 and 3) or additional elements may operate or cooperate to identify a correlation between the accessing of particular web content or services from a mobile terminal and the transmission of promotional content including a hyperlink. In such an implementation, a "click-thru" type of billing model for distributing promotional content would, therefore, be feasible. Additionally, such an implementation may also enable a business or pricing model wherein, services provided via one or more networks may be provided to the mobile device user at a reduced, free or subsidized rate.

In general, mobile marketing and advertising activities can be divided into four categories: mobile Customer Relations Management (CRM), mobile marketing, mobile advertising, and mobile direct advertising. Mobile CRM involves a combination of mobile advertising, mobile marketing and mobile direct marking (each explained herein) in a manner that establishes a long-term, engaging relationship between a customer or potential customer (i.e., recipient) and a promoting company such as an advertiser of one or more products and/or services.

Mobile marketing involves the systematic planning, implementation and control of a mix of business activities intended to bring together buyers and sellers for the mutually advantageous exchange or transfer of products or services where the primary point of contact with the potential recipient is via their mobile device. To the contrary, mobile advertising may be thought of more narrowly as the paid, public, non-personal announcement of a persuasive message by an identified sponsor (i.e., an advertiser), the non-personal presentation or promotion by a firm of its products to its existing and potential customers where such communication is delivered to a mobile phone or other mobile device. Examples of mobile advertising would include: Wireless Application Protocol (WAP) and Web banner advertisements, mobile search advertising, mobile video bumpers, and interstitial advertisements.

Mobile direct marketing differs from mobile marketing typically in that direct marketing involves advertising content being delivered to a mobile device on an individual basis. Accordingly, examples of mobile direct marketing include the sending of Short Messaging Service (SMS), Enhanced Messaging Service (EMS), Multimedia Messaging Service (MMS) or WAP push messages, Bluetooth messaging and other marketing to mobile devices.

Such direct marketing often uses text and picture messaging. MMS, also known as picture messaging, is a widely used service with mobile phone users. Picture messaging refers to the sending of an image, e.g., a photograph produced by a mobile phone, to another mobile phone or to a server or electronic-mail account. Conventionally, the images are sent in some predetermined picture format, e.g., Joint Picture Expert Group (JPEG). In addition to pictures, MMS messages might compose of video, audio, hypertext, links, etc.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, it should be understood that the term "promotional content" may include various types of advertising material including any one of or combination of text, pictures, audio, video, links to web-sites or other locations of information, telephone numbers, electronic mail addresses, downloadable files including but not limited to audio files including ring tones, songs, etc, computer implemented games, video files, etc. Also, it should be understood that the term "promotional content" includes any type of content provided in connection with mobile marketing, mobile advertising or other material provided for the purpose of persuading mobile device users.

Although the utility of various invention embodiments has been described in connection with the distribution of promotional content, it should be understood that distributed information is not limited to promotional content but may also or alternatively include non-promotional material. Further, it should be appreciated that the invention may be used to transmit various types of content, e.g., information, software updates, etc., not just promotional content.

Moreover, although various embodiment of the invention have been described herein that indicate that content is sent to a mobile device user prior to or as part of enabling access to web content or services, it should be understood that content may be sent to the mobile device user after or during the web content and/or services are accessed. For example, because the AMS may have access to certain mobile device user information through the network element(s), the AMS may be configured to access information about a mobile device user and send follow up information specific to either the accessed web content or previously delivered content. For example, assume a mobile device user was sent an advertisement on Disneyland™ in return for Disney™ sponsoring a user's access of a web page pertaining to diagnosing common children's diseases at home. Based on user profile information available to the network operator serving the mobile device user, the AMS may access the user's information to identify the user's email address and send a coupon for reduced rates at Disneyland™.

Additionally, it should be understood that the functionality described in connection with various described components of various invention embodiments may be combined or separated from one another in such a way that the architecture of the invention is somewhat different than what is expressly disclosed herein. For example, the gateway 145 described in connection with FIG. 1 may be considered to be a network element although other network elements are illustrated as network element(s) 135.

Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of advertisers, advertising channel provider(s), network providers, marketing organizations, etc.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose system via software implementations.

Additionally data size requirements or levels may differ for users with different data plans, users roaming, etc. depending on the radio network used (e.g., WLAN v. GPRS), depending on carrier (operator) etc.

Additionally embodiments of the invention can be used to implement such a service portal that shows those items that might fulfill criteria of sponsor and content size. As an example, because news site http://news.google.com automatically aggregates news from thousands of sources, one illustrated embodiment may show a mobile user which news items that can be accessed through sponsorship by one or more advertisers while the remaining news items may be filtered such that they are not displayed or are displayed in a separate listing.

As a result, it will be apparent for those skilled in the art that the illustrative embodiments described are only examples and that various modifications can be made within the scope of the invention as defined in the appended claims.

The invention claimed is:

1. A system comprising:
a processor; and
a memory containing instruction that, when executed, cause the processor to:
receive instructions to access a specified uniform resource locator (URL) that provides content of a first content category type;
analyze the instructions and the specified URL to determine a data size requirement for providing access to the specified URL;
determine that the data size requirement is greater than a value specified by a first access enabling entity;
identify an alternate URL that provides content of the first category type and that has a data size requirement that is less than the value specified by the first access enabling entity; and
enable access to the alternate URL.

2. The system of claim 1, wherein the instructions further cause the processor to:
select an information provider to enable access to the alternate URL based on an amount of data that the information provider has agreed to sponsor in return for distribution of content associated with the information provider.

3. The system of claim 1, wherein the instructions further cause the processor to:
transmit content associated with the information provider sponsoring access to the alternate URL.

4. The system of claim 3, wherein the transmission of content is performed prior to enabling access to the alternate URL.

5. The system of claim 3, wherein the transmission of content is performed as part of enabling access to the alternate URL.

6. The system of claim 3, wherein the transmission of content is performed subsequent to enabling access to the alternate URL.

7. The system of claim 1, wherein access to the alternate URL is enabled via a second access session.

8. The system of claim 7, wherein the instructions further cause the processor to:
transmit content associated with an information provider sponsoring the second access session.

9. The system of claim 8, wherein the transmission of content is performed prior to enabling access to the alternate URL.

10. The system of claim 8, wherein the transmission of promotional content is performed as part of enabling access to the alternate URL.

11. The system of claim 8, wherein the transmission of promotional content is performed subsequent to enabling access to the alternate URL.

12. The system of claim 1, wherein the identification of the alternate URL is performed by analyzing metadata associated with the specified URL and identifying other URLs having the same or similar meta data.

13. The system of claim 12, wherein the analysis of metadata is performed by a search engine.

14. A method comprising:
receiving, by a processor, instructions from a mobile device to access a specified URL that provides content of a first content category type;
analyzing, by the processor, the instructions and the specified URL to determine a data size requirement for providing access to the specified URL;
determining, by the processor, that the data size requirement is greater than a value specified by a first access enabling entity;
identifying, by the processor, an alternate URL that provides content of the first category and that has a data size requirement that is less than the value specified by the first access enabling entity; and
enabling, by the processor, access to the alternate URL.

15. The method of claim 14, further comprising transmitting to the mobile device content associated with an information provider enabling access to the alternate URL.

16. The method of claim 15, wherein the transmission of content is performed prior to enabling access to the alternate URL.

17. The method of claim 15, wherein the transmission of content is performed as part of enabling access to the alternate URL.

18. The method of claim 15, wherein the transmission of promotional content is performed subsequent to enabling access to the alternate URL.

19. The method of claim 14, further comprising enabling access to the alternate URL via a second access session.

20. The method of claim 19, further comprising transmitting content associated with the information provider sponsoring the second access session.

21. The method of claim 20, wherein the transmission of content is performed prior to enabling access to the alternate URL.

22. The method of claim 20, wherein the transmission of content is performed as part of enabling access to the alternate URL.

23. The method of claim 20, wherein the transmission of content is performed subsequent to enabling access to the alternate URL.

24. The method of claim 14, wherein the identification of the alternate URL is performed by analyzing metadata associated with URLs having the same or similar meta data.

25. The method of claim 24, wherein the analysis of metadata is performed by a search engine.

26. A non-transitory computer readable medium comprising computer executable instructions for carrying out a method for operating a web-browsing service, the method comprising:
receiving instructions from a mobile device to access a specified URL that provides content of a first content category type;
analyzing the instructions and the specified URL to determine a data size requirement for providing access to the specified URL;
determining that the data size requirement is greater than a value specified by a first access enabling entity;
identifying an alternate URL that provides content of the first category type that has a data size requirement that is less than the value specified by the first access enabling entity; and
enabling access to the alternate URL.

* * * * *